(12) United States Patent
VanOrden et al.

(10) Patent No.: US 9,188,277 B2
(45) Date of Patent: Nov. 17, 2015

(54) CABINET INSTALLATION DEVICE

(75) Inventors: Donald E. VanOrden, Montgomery, TX (US); Robert J. Frye, Murffessboro, TN (US)

(73) Assignee: R&D Precision Tools, Montgomery, TX (US)

( * ) Notice: Subject to any disclaimer, the term of this patent is extended or adjusted under 35 U.S.C. 154(b) by 925 days.

(21) Appl. No.: 13/363,430

(22) Filed: Feb. 1, 2012

(65) Prior Publication Data
US 2013/0193625 A1   Aug. 1, 2013

(51) Int. Cl.
*B23Q 3/00* (2006.01)
*B23Q 7/00* (2006.01)
*F16M 11/22* (2006.01)
*F16M 13/02* (2006.01)

(52) U.S. Cl.
CPC ............. *F16M 11/22* (2013.01); *F16M 13/02* (2013.01); *Y10T 29/49998* (2015.01)

(58) Field of Classification Search
CPC ........ E16M 11/22; F16M 13/02; F16M 11/22
USPC .............. 269/19, 37, 79, 296, 315; 29/281.1, 29/559; 33/347, 371
See application file for complete search history.

(56) References Cited

U.S. PATENT DOCUMENTS

| | | | | |
|---|---|---|---|---|
| 1,630,601 A | * | 5/1927 | Berscheid et al. | 269/19 |
| 2,133,605 A | * | 10/1938 | Wikstrom | 269/8 |
| 3,180,036 A | * | 4/1965 | Meeks, Sr. | 33/347 |
| 3,524,239 A | * | 8/1970 | Lewis | 269/289 R |
| 4,342,439 A | | 8/1982 | Bruner | |
| 4,715,760 A | * | 12/1987 | Browning | 414/10 |
| 4,868,943 A | * | 9/1989 | Robichaud | 7/166 |
| 4,981,288 A | * | 1/1991 | Goss | 269/79 |
| 5,129,774 A | * | 7/1992 | Balseiro et al. | 414/11 |
| 5,645,272 A | * | 7/1997 | Brennan, Sr. | 269/68 |
| 5,707,125 A | | 1/1998 | Coglin | |
| 5,718,493 A | | 2/1998 | Nikolai | |
| 5,979,854 A | * | 11/1999 | Lundgren et al. | 248/354.3 |
| 6,234,440 B1 | * | 5/2001 | Boney et al. | 248/354.1 |
| 6,322,062 B1 | * | 11/2001 | Conn et al. | 269/20 |
| 6,508,448 B1 | * | 1/2003 | Stewart | 248/354.1 |
| 6,581,921 B2 | | 6/2003 | Griggs | |
| 6,607,341 B1 | * | 8/2003 | Wade | 414/10 |
| 6,612,533 B2 | | 9/2003 | Biles et al. | |
| 6,675,490 B1 | * | 1/2004 | Krehel et al. | 33/382 |
| 7,152,833 B1 | * | 12/2006 | Pitsenbarger | 248/161 |
| 7,552,540 B2 | * | 6/2009 | Ming | 33/347 |
| 8,739,423 B1 | * | 6/2014 | Cortum et al. | 33/613 |
| 2003/0006354 A1 | * | 1/2003 | Biles et al. | 248/354.1 |
| 2003/0033722 A1 | * | 2/2003 | Lanham | 33/374 |
| 2003/0178759 A1 | * | 9/2003 | Bartley, Jr. | 269/37 |
| 2006/0174504 A1 | * | 8/2006 | Szumer et al. | 33/613 |
| 2007/0166498 A1 | | 7/2007 | Penar | |
| 2008/0116330 A1 | | 5/2008 | Cotto | |

(Continued)

*Primary Examiner* — Lee D Wilson
*Assistant Examiner* — Mahdi H Nejad
(74) *Attorney, Agent, or Firm* — Tumey L.L.P.

(57) ABSTRACT

A method for installing objects such as cabinets on a vertical surface such as a wall includes the use of a novel support device having an adjustable leg and an upper portion including two vertically spaced support surfaces. Two of the support devices are first placed at a selected height at an angle to the wall for initially supporting the object on a first support surface. The support devices are then sequentially moved to extend between a front portion of the object and the floor so that the object rests on the second support surface thus freeing both hands of the installer.

2 Claims, 3 Drawing Sheets

(56) References Cited

U.S. PATENT DOCUMENTS

| | | | |
|---|---|---|---|
| 2008/0301957 A1* | 12/2008 | Vernola | 33/371 |
| 2009/0008849 A1* | 1/2009 | Cunningham | 269/79 |
| 2009/0235544 A1* | 9/2009 | Spaulding | 33/301 |
| 2010/0000107 A1* | 1/2010 | Cobb et al. | 33/374 |

\* cited by examiner

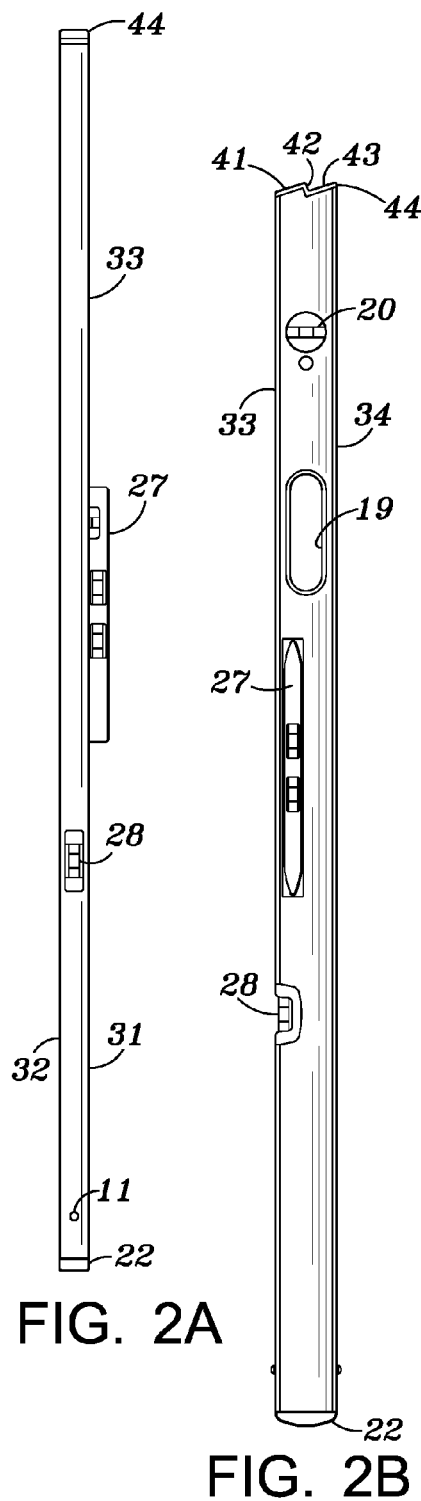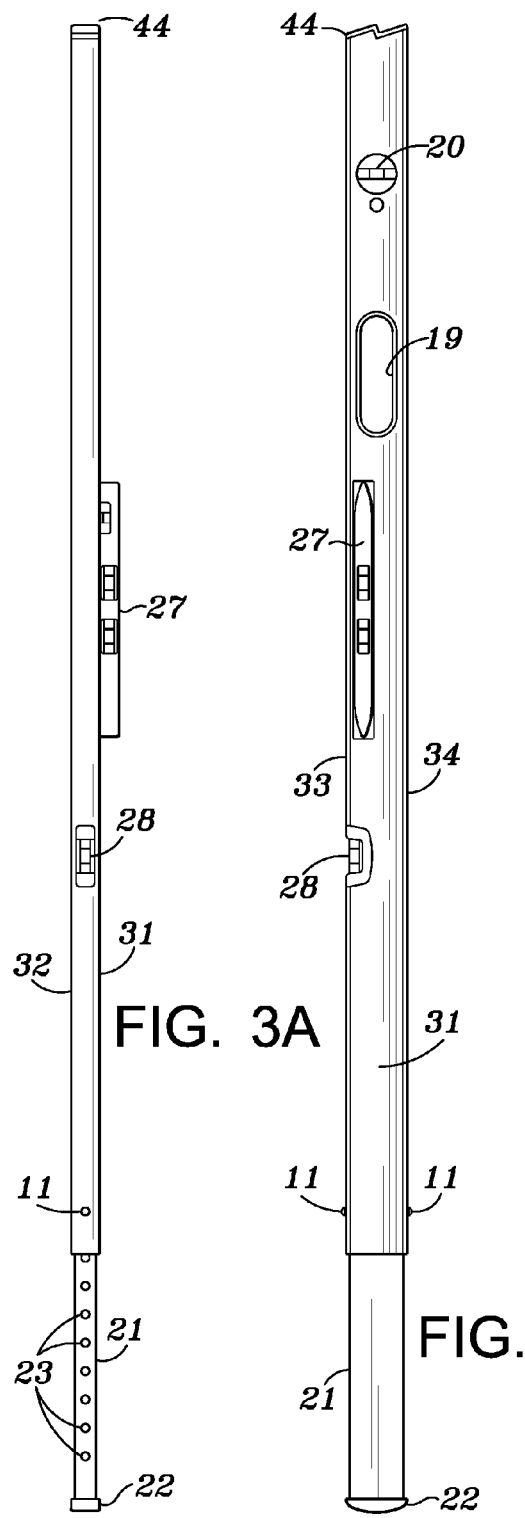
FIG. 2A  FIG. 2B  FIG. 3A  FIG. 3B

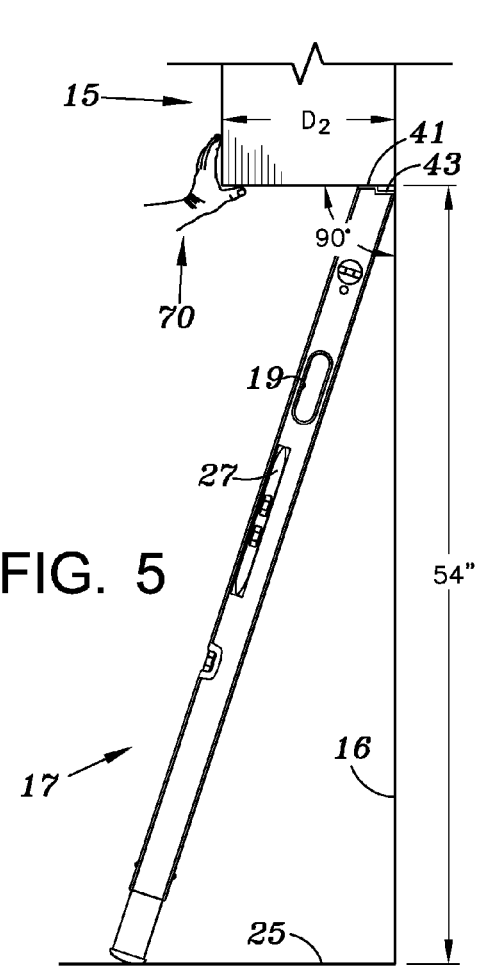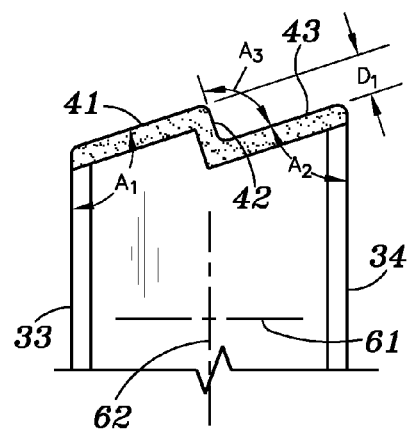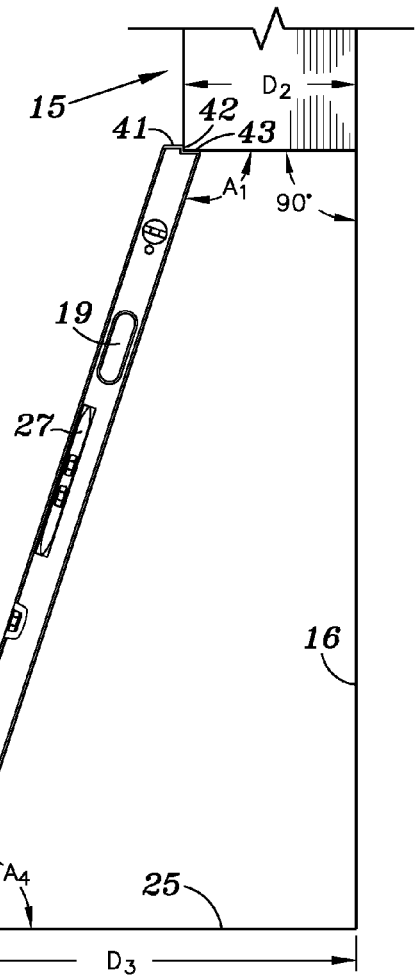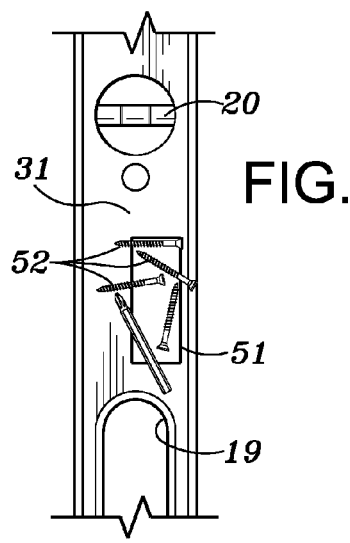

CABINET INSTALLATION DEVICE

BACKGROUND OF INVENTION

1. Field of the Invention

The invention disclosed and claimed in this application is directed to a support mechanism for supporting objects such as cabinets during installation of the objects on a vertical surface. Two of the supports can be utilized in such a manner so as to allow installation of the object by a single installer.

2. Description of Related Art

Prior art devices for installation of objects such as cabinets on walls include an adjustable upright support having an adjustable carrier for supporting the cabinet. Such a device is shown in U.S. Pat. No. 6,612,533. This device is designed to hold cabinets in place before installation only on a level surface with level walls. This product has adjustments for correcting cabinet for level but not for plumb, which is detrimental for cabinet installation. This design is also bulky, utilizing too much space for tool storage and transportation, and also adds to the amount of tools needed by the installer rather than eliminating tools already needed for cabinet installation.

Another prior art device disclosed in U.S. Pat. No. 5,718,473 consists of a bracket securing the load and weight of the cabinet, but still requires more than one person to install cabinets correctly using a series of steps that are eliminated by the support device of this invention.

BRIEF SUMMARY OF THE INVENTION

The present invention includes two substantially similar adjustable support devices. The overall length of the device is adjustable. The upper portion of the support includes two distinct support surfaces separated by a step and angled with respect to the longitudinal axis of the support device. The support devices can be placed on a vertical wall surface to initially support the object such as a cabinet on one of the support surfaces and then can be moved outwardly and positioned under the object to support the object on the second support surface as will be explained herein. This permits one installer to install the object on a vertical surface without additional help.

BRIEF DESCRIPTION OF THE SEVERAL VIEWS OF THE DRAWING(S)

FIG. 2A is a front view of one of the support devices shown in FIG. 1.

FIG. 2B is a side view of one of the support devices shown in FIG. 1.

FIG. 3A is a front view of one of the support devices shown in FIG. 1 with an adjustable leg portion extended.

FIG. 3B is a side view of one of the support devices shown in FIG. 1 with an adjustable leg portion extended.

FIG. 4 is a side view of the top portion of a support device.

FIG. 5 is a side view of one of the support devices extending at an angle between the floor and a vertical surface supporting a cabinet with the aid of an installer.

FIG. 6 is a side view of one of the support devices supporting the front portion of the object against a vertical surface.

FIG. 7 is a side view of a portion of one of the support devices including an optional magnetic plate.

DETAILED DESCRIPTION OF THE INVENTION

Figure 1:
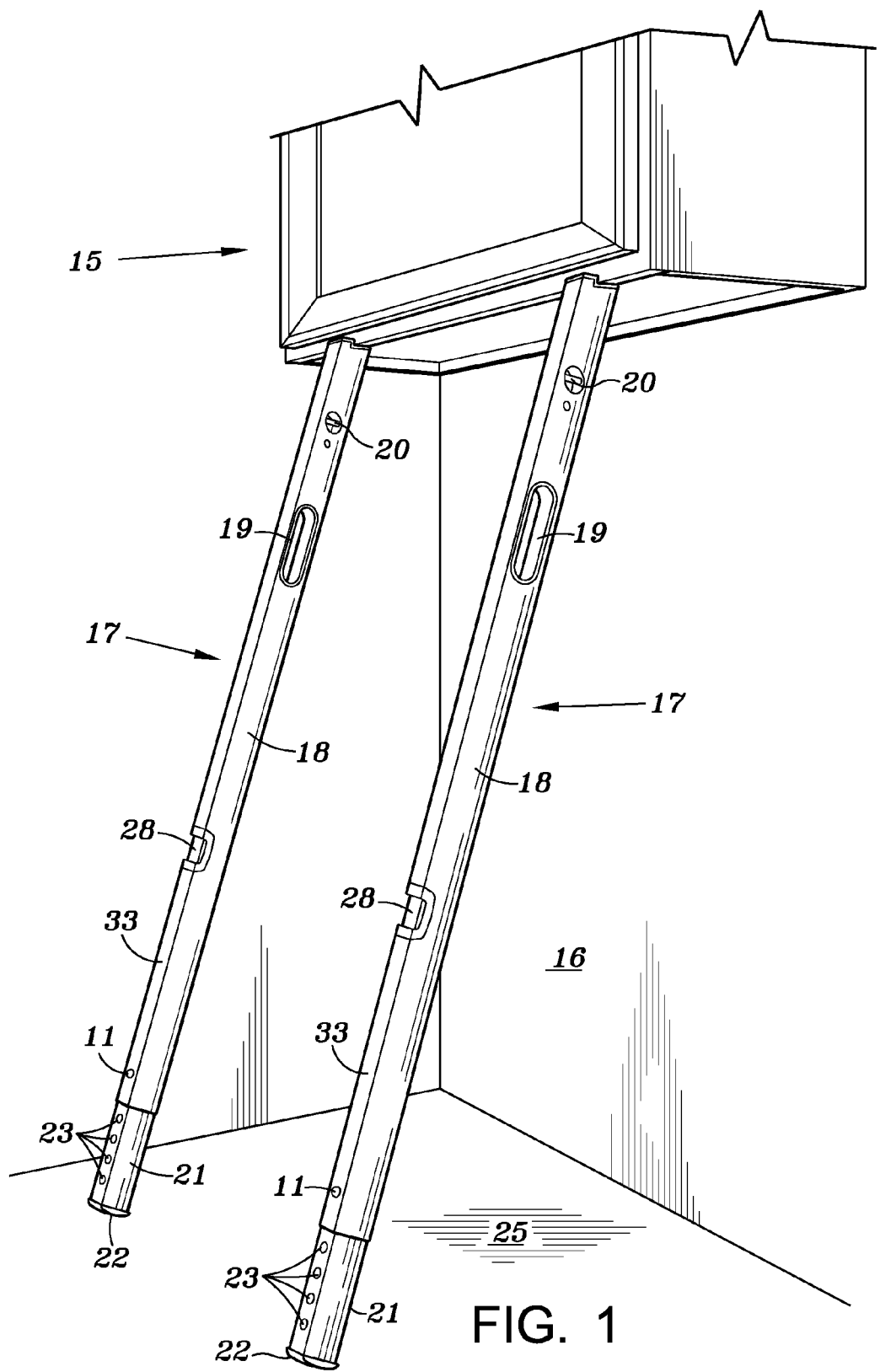
FIG. 1 is a perspective view of the two support devices according to an embodiment of the invention supporting the object against a vertical surface.

Referring to FIG. 1, it can be seen that two of the support devices 17 are used to install a cabinet 5 or other structure on a vertical wall 16. Each support device includes a generally rectangular elongated body 18 having a front surface 33, a rear surface 34 (FIG. 3B), and side surfaces 31 and 32. Each support device includes a hollow lower portion that telescopically receives a foot member 21 that is adjustable in length by virtue of a plurality of holes 23 that align with an aperture 11 provided in the lower portion of body 18. A suitable pin or detent mechanism may be used to lock the leg member in place. Other well-known adjustable length mechanisms may also be used such as a screw and thread arrangement. The lower portion of foot 21 that engages the floor 25 may be provided with a curved, anti skid element 22.

Each support device may also include a handle portion 19 and built in levels 20 and 28 in vertical and horizontal orientations when the support device is extending vertically from a horizontal surface.

The configuration of the upper portion 44 of the support device according to an embodiment of the invention will now be described. Referring to FIG. 4, the upper portion of the support device includes a longitudinal axis 62 and a transverse axis 61 that is perpendicular to the longitudinal axis 62. Longitudinal axis 62 is perpendicular to the horizontal when the support device is in an upright vertical position as shown in FIG. 2B.

The upper portion of support device as shown in FIG. 4 includes first support surface 41 that is inclined with respect to transverse axis 61 and forms an angle A, with the front surface 33 of the support device. A step portion 42 extends downwardly from surface 41 to a second support surface 43 that is also angled with respect to transverse axis 61. Surface 43 extends from the lower portion of step portion 42 to the rear surface 34. Surfaces 41 and 43 may be in planes that are parallel to each other and are spaced apart by a distance D1. An angle $A_3$ is formed by surfaces 42 and 43 and angle $A_2$ is formed between surface 43 and rear surface 34 of the support.

Angles $A_1$, $A_2$, and $A_3$ are chosen so as to support the cabinet in the manner shown in FIGS. 5 and 6 at varying heights according to the length of the adjustable feet 21.

Surfaces 41, 42, and 43 may be formed of a piece of hard plastic material such as nylon.

Suitable values for angles $A_1$, $A_2$, and $A_3$ are 108°, 72°, and 90°, ±3° respectively. Distance D1 may be approximately ⅜".

FIG. 7 illustrates a magnetic plate 51 that can be attached to one of the side surfaces 31 or 32. Magnetic plate 51 is useful for holding items such as screws and drill bits that are used during the installation process. The support device 17 may include side pockets that hold additional tools such as levels 27.

The installation of cabinets using the support devices will now be described. Two of the support devices are placed between the floor 25 and vertical surface 16 as shown in FIG. 5 and spaced apart a distance less that the width of the cabinet. The installer then picks up the cabinet 15 and supports it on surface 41 of the support device and with their hand 70 pushes the cabinet against vertical surface or wall 16. With their other hand, the installer now removes one of the support devices by gasping handle 19 to the position shown in FIG. 6 where the lower portion of the cabinet is now supported by step 42 and second surface 43. The second support device is now moved to the position in FIG. 1. In this configuration the cabinet 15 is supported against the vertical surface by the support devices 17 and both hands of the installer are free. The installer is now free to use a suitable tool to attach the cabinet to the wall 16 with screws 52 or the like. During this process the installer can check to see if the cabinet is level by using levels 27, 20 and 28. If not level, the feet 21 of the support devices can be moved in either direction accordingly.

Although the present invention has been described with respect to specific details, it is not intended that such details should be regarded as limitations on the scope of the invention, except to the extent that they are included in the accompanying claims.

We claim:

1. A method of installing a cabinet having a front portion and a wall engaging rear portion on a vertical surface comprising:
    providing a pair of support devices having adjustable legs and an upper portion having a first and a second parallel spaced apart support surfaces, said support surfaces are inclined with respect to a transverse axis of the adjustable legs
    positioning the support devices between a floor and the vertical surface at a selected height,
    supporting the wall engaging rear portion of the cabinet on the first support surface of each of the support devices, and holding the cabinet against the vertical surface with at least one hand,
    sequentially repositioning the support devices away from the vertical surface to extend between the floor and the front portion of the cabinet,
    supporting the front portion of the cabinet on each of the second support surfaces of the support devices, and
    securing the cabinet to the vertical surface.

2. The method of claim 1 including a step of checking a horizontal orientation of the cabinet and adjusting the position of a lower end of the support device on the floor to maintain the cabinet level.

* * * * *